United States Patent
Lee et al.

(10) Patent No.: US 10,492,136 B2
(45) Date of Patent: Nov. 26, 2019

(54) METHOD AND APPARATUS FOR POWER SAVING OF TERMINAL IN WIRELESS LAN SYSTEM

(71) Applicants: Samsung Electronics Co., Ltd., Gyeonggi-do (KR); Seoul National University R&DB Foundation, Seoul (KR)

(72) Inventors: Okhwan Lee, Seoul (KR); Sunghyun Choi, Seoul (KR); Jihoon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 129 days.

(21) Appl. No.: 15/535,246

(22) PCT Filed: Dec. 10, 2015

(86) PCT No.: PCT/KR2015/013517
§ 371 (c)(1),
(2) Date: Jun. 12, 2017

(87) PCT Pub. No.: WO2016/093639
PCT Pub. Date: Jun. 16, 2016

(65) Prior Publication Data
US 2017/0367043 A1    Dec. 21, 2017

(30) Foreign Application Priority Data
Dec. 12, 2014  (KR) .................. 10-2014-0179812

(51) Int. Cl.
*H04W 52/02* (2009.01)
*H04W 84/12* (2009.01)
(Continued)

(52) U.S. Cl.
CPC ....... *H04W 52/0209* (2013.01); *H04W 52/02* (2013.01); *H04W 52/0203* (2013.01);
(Continued)

(58) Field of Classification Search
CPC . H04W 84/12; H04W 52/02; H04W 52/0203; H04W 52/0209; H04W 88/02;
(Continued)

(56) References Cited

U.S. PATENT DOCUMENTS

| 7,768,971 B2 | 8/2010 | Trainin |
| 8,711,821 B2 | 4/2014 | Grandhi |

(Continued)

FOREIGN PATENT DOCUMENTS

| KR | 101158330 | 6/2012 |
| KR | 101407422 | 6/2014 |
| KR | 1020140109773 | 9/2014 |

OTHER PUBLICATIONS

PCT/ISA/210 Search Report issued on PCT/KR2015/013517 (pp. 3).
PCT/ISA/237 Written Opinion issued on PCT/KR2015/013517 (pp. 5).

*Primary Examiner* — Kyaw Z Soe
(74) *Attorney, Agent, or Firm* — The Farrell Law Firm, P.C.

(57) ABSTRACT

The present invention relates to an apparatus and method for power saving of a terminal in a wireless communication system and, particularly, to an apparatus and method for power saving of a terminal in a wireless LAN system. A method according to an embodiment of the present invention, which is a data transmission and reception method for power saving of a terminal in a wireless LAN system access point, may comprise the steps of: transmitting a control frame including information for channel bonding power saving control; when there is data to be transmitted from a specific terminal, determining whether the corresponding terminal is in a state where a channel bonding power saving control function is activated; when the terminal is in a state where the channel bonding power saving control function is (Continued)

activated, checking whether the terminal is in a dynamic mode; and when the terminal is in the dynamic mode, configuring the data to be transmitted as a data frame for transmitting the data in a channel bonding scheme, and transmitting the data frame.

18 Claims, 11 Drawing Sheets

(51) Int. Cl.
*H04W 88/02* (2009.01)
*H04W 88/08* (2009.01)

(52) U.S. Cl.
CPC ... *H04W 52/0206* (2013.01); *H04W 52/0235* (2013.01); *H04W 84/12* (2013.01); *H04W 88/02* (2013.01); *H04W 88/08* (2013.01); *Y02D 70/00* (2018.01); *Y02D 70/14* (2018.01); *Y02D 70/142* (2018.01)

(58) Field of Classification Search
CPC ............ H04W 88/08; H04W 52/0206; H04W 52/0235; H04W 72/046; H04W 72/0473; Y02B 60/50; Y02D 70/00; Y02D 70/14; Y02D 70/142; Y02D 70/444; H04B 7/0689; H04B 7/0871; H04B 7/0413; H04B 7/0691; H04B 7/0693; H04B 7/0697; H04B 7/0874; H04B 7/0877
See application file for complete search history.

(56) References Cited

U.S. PATENT DOCUMENTS

| | | | |
|---|---|---|---|
| 2010/0046450 A1 | 2/2010 | Seyedi-Isfahani et al. | |
| 2013/0071111 A1 | 3/2013 | Yoo et al. | |
| 2013/0176926 A1* | 7/2013 | Lee .................... | H04W 52/0216 370/311 |
| 2014/0254444 A1 | 9/2014 | Kim et al. | |
| 2015/0016260 A1* | 1/2015 | Chow .................... | H04L 45/22 370/235 |
| 2015/0181469 A1* | 6/2015 | Yu ........................ | H04B 7/0689 370/311 |
| 2016/0113016 A1* | 4/2016 | Kim ...................... | H04L 1/0053 370/312 |
| 2016/0127028 A1* | 5/2016 | Wang .................... | H04B 7/0817 370/329 |
| 2016/0127997 A1* | 5/2016 | Ang .................. | H04W 52/0216 370/311 |

* cited by examiner

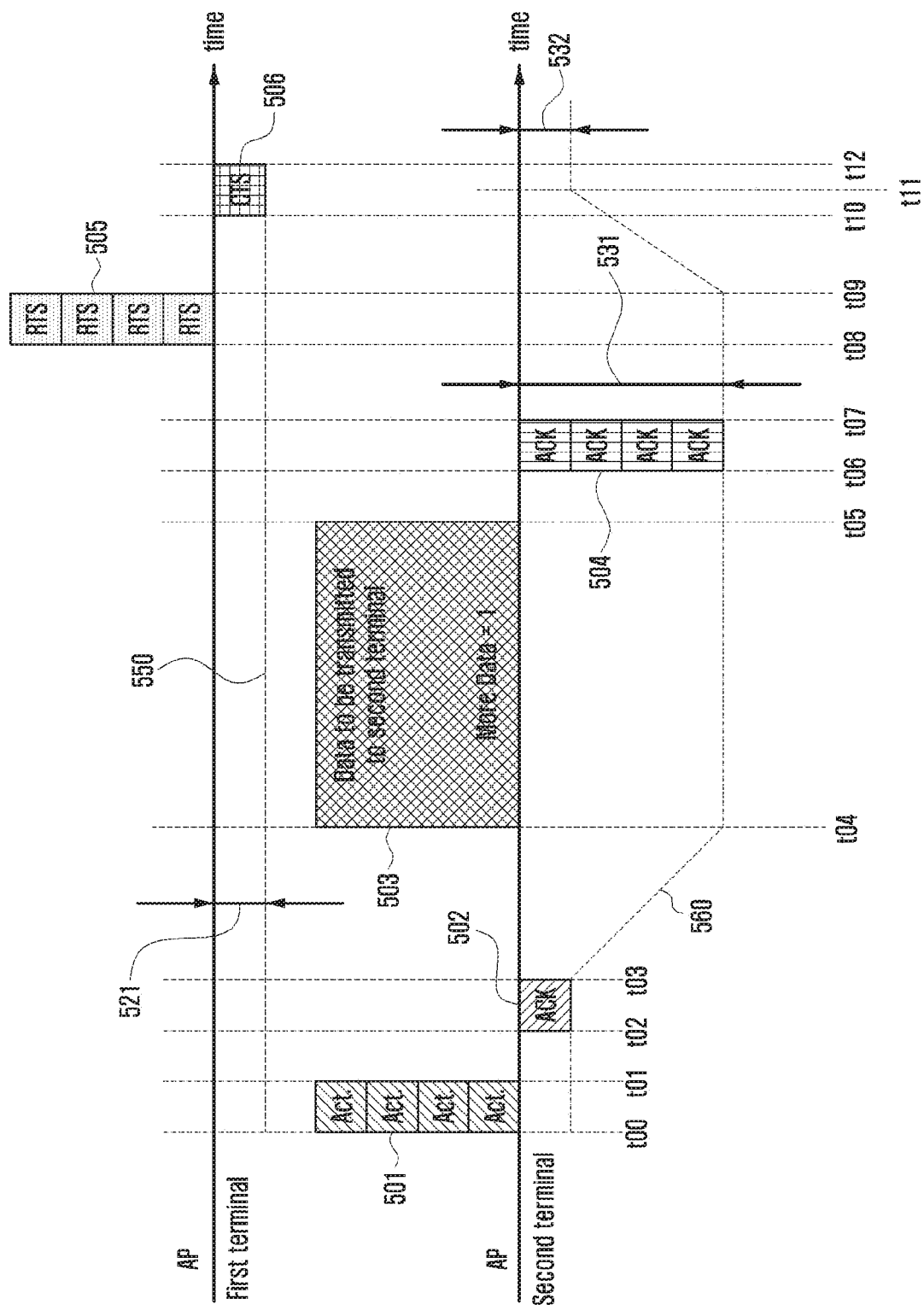

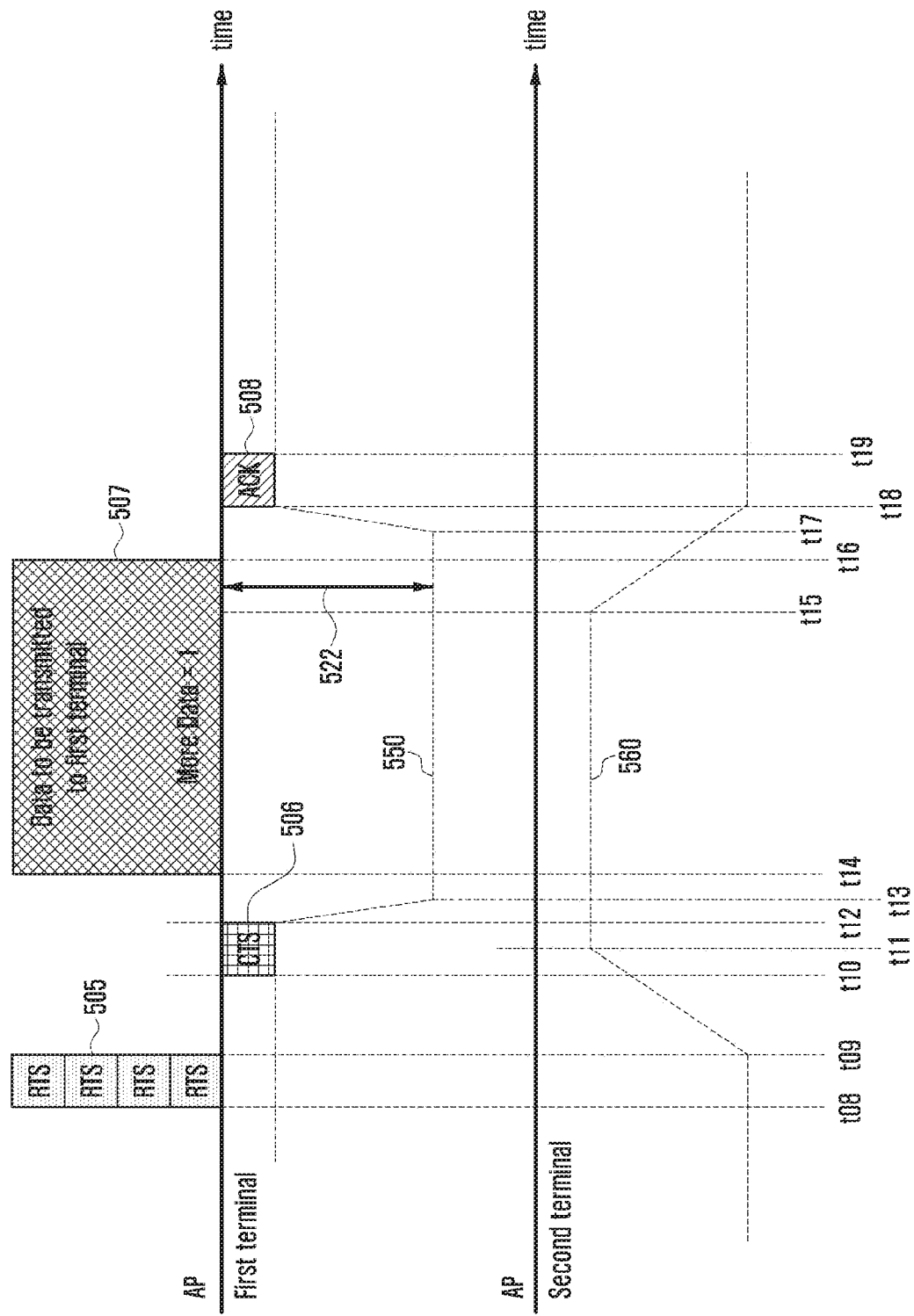

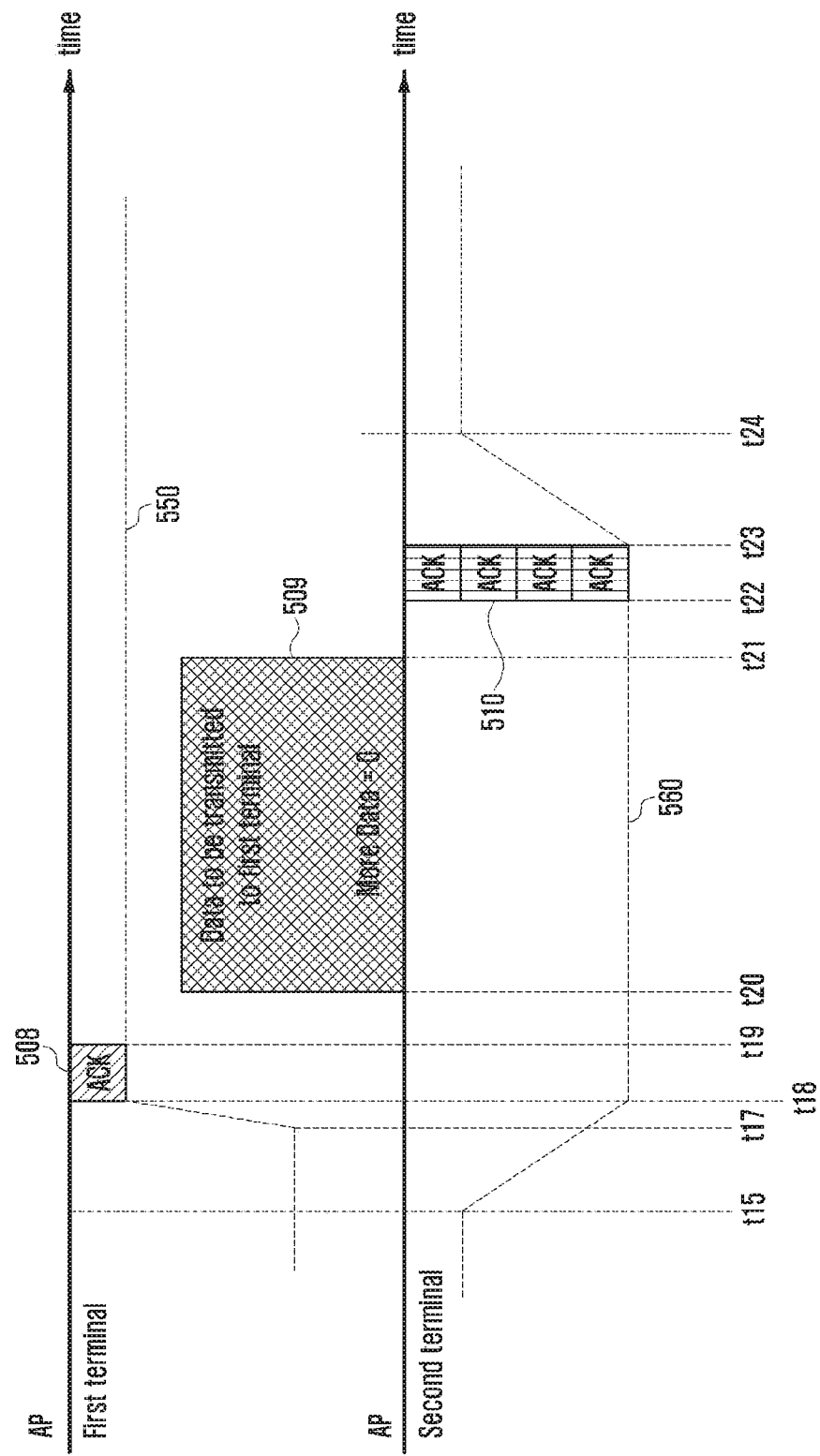

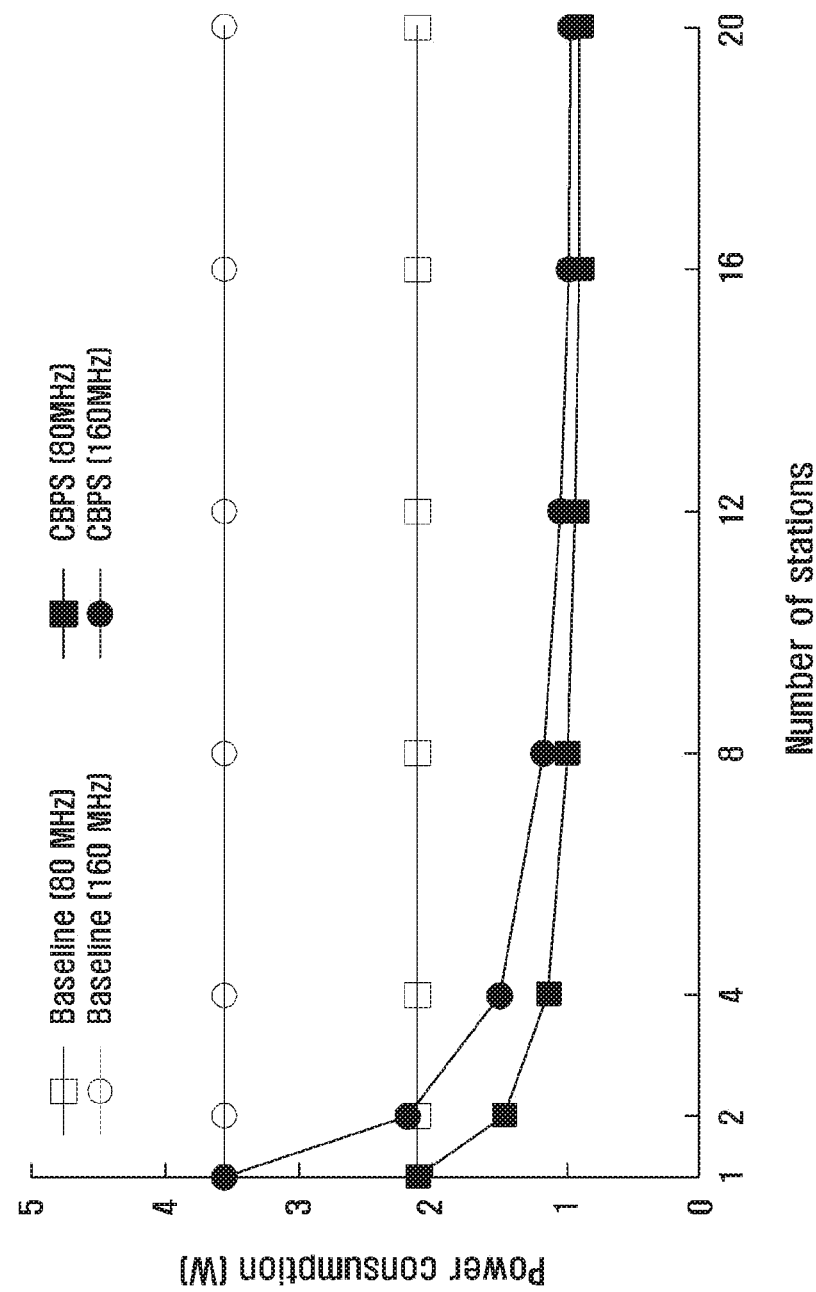

METHOD AND APPARATUS FOR POWER SAVING OF TERMINAL IN WIRELESS LAN SYSTEM

PRIORITY

This application is a National Phase Entry of PCT International Application No. PCT/KR2015/013517 which was filed on Dec. 10, 2015, and claims priority to Korean Patent Application No. 10-2014-0179812, which was filed on Dec. 12, 2014, the contents of each of which are incorporated herein by reference.

TECHNICAL FIELD

The present invention relates to an apparatus and a method for power saving of a terminal in a wireless communication system, and, more particularly, to an apparatus and a method for power saving of a terminal in a wireless LAN system.

BACKGROUND ART

With the development of wireless communication technologies, various types of wireless communication schemes and technologies are being used. The typical wireless communication technologies that have been most widely used may include a cellular system and a wireless LAN system. In the wireless communication system, a terminal generally has mobility and therefore uses power of a battery, or the like. Therefore, power saving of the terminal in the wireless communication system is very important factor.

Recently, a wireless local area network (wireless LAN) has been trying to dramatically improve a physical layer (PHY) rate (PHY rate) in order to satisfy a high traffic requirement of a user. In particular, as a part of efforts to improve the PHY rate from the latest IEEE 802.11 standard, a channel bonding technique and a multiple input, multiple output (MIMO) technology have been adopted. The IEEE 802.11n standard completed in 2009 bonds two adjacent 20 MHz channels to support up to 40 MHz bandwidth and supports the use of up to four antennas and multiple streams. In the most recently completed IEEE 802.11ac, up to eight adjacent channels may be bonded to support an ultra-wideband bandwidth of 160 MHz for higher performance. Further, the IEEE 802.11ac may transmit up to 8 multiple streams and is configured to provide a 256-quadrature amplitude modulation (QAM) modulation scheme to increase data transmission efficiency.

These transmission rate improvement schemes show dramatic performance improvement in throughput in the wireless LAN system. However, the wireless LAN terminal increases complexity of the operation and dramatically increases power consumption. In order to solve the problems, the IEEE 802.11n standard has tried to reduce unnecessary power consumption due to the use of multiple antennas by defining a spatial multiplexing power save (SMPS) operation.

However, it is difficult to obtain a sufficient power saving effect in the wireless LAN system by the method alone. Therefore, there is a need for an effective method for power saving in a wireless LAN system.

DISCLOSURE OF INVENTION

Technical Problem

The present invention has been made in order to solve the above problems, and an object of the present invention is to provide an apparatus and a method for controlling a bandwidth upon the use of a channel bonding technology in order to dramatically improve power efficiency in a wireless LAN system.

Another object of the present invention is to provide an apparatus and a method for capable of being easily implemented in a wireless LAN terminal and applied to an actual product and saving power consumption.

Still another object of the present invention is to provide an apparatus and a method capable of coexisting with the existing wireless LAN system and saving power consumption.

Solution to Problem

In order to achieve the objects, according to other embodiment of the present invention, an access point apparatus for saving power consumption in a wireless LAN system may include: a wireless processor lowering a band of a received wireless signal and up-converting a band of a signal to be transmitted; a modem performing demodulation and decoding of a signal received by the wireless processor and encoding, modulating, and outputting the signal to be transmitted; a data processor dividing a size of data to be transmitted depending on the number of bands to be transmitted and the band; a memory storing whether a channel bonding power saving control function received from terminals is activated and mode information; and a controller controlling a generation and a transmission of a control frame including information for the channel bonding power saving control function of the access point, controlling a specific terminal to check whether the channel bonding power saving control function is in an activated state and a mode by checking the memory if there is data to be transmitted from the corresponding terminal, and controlling the terminal to configure the data to be transmitted as a data frame transmitted in a channel bonding scheme if it is determined that the channel bonding power saving control function is in the activated state and in a dynamic mode and transmit the data frame.

According to another embodiment of the present invention, an apparatus for transmitting and receiving data for power saving of a terminal in a wireless LAN system may include: a wireless processor lowering a band of a received wireless signal and up-converting a band of a signal to be transmitted; a modem performing demodulation and decoding of a signal received by the wireless processor and encoding, modulating, and outputting the signal to be transmitted; a data reconfiguration unit reconfiguring received data; a memory storing information for a channel bonding power saving control provided from an access point and information on whether a channel bonding power saving control function of the terminal is possible and mode information; and a controller performs a control to set the information on whether the channel bonding saving control function is possible and the mode information in the memory and transmit the information and the mode information if a control frame including channel bonding power saving control function information is received, check whether a specific frame is an initial frame if the specific frame is received by the terminal during the control of the wireless processor to hear only a primary band, and perform the wireless processor to upward switch to a bandwidth required by the access point if it is determined as the check result that the initial frame is received.

According to still another embodiment of the present invention, a method for transmitting and receiving data for power saving of a terminal in a wireless LAN system access point may include: transmitting a control frame including information for a channel bonding power saving control; determining whether the corresponding terminal is in a state where a channel bonding power saving control function is activated if there is data to be transmitted from a specific terminal; checking whether the terminal is in a dynamic mode if the terminal is in the state where the channel bonding power saving control function is activated; and configuring the data to be transmitted as a data frame for transmitting the data in a channel bonding scheme and transmitting the data frame if the terminal is in the dynamic mode.

According to yet another embodiment of the present invention, a method for transmitting and receiving data for power saving of a terminal in a wireless LAN system may include: setting and transmitting whether a channel bonding saving control function is possible and mode information if a control frame including channel bonding power saving control function information is received; checking whether a specific frame is an initial frame if the specific frame is received by the terminal during hearing of primary band; and performing upward switching in a bandwidth required in the access point if the initial frame is received.

Advantageous Effects of Invention

In accordance with the embodiments of the present invention, the unnecessary power consumption can be reduced by utilizing the channel bonding technique of the wireless communication device. In addition, it is possible to show the great performance improvement with the simple implementation, define the action frame for information transmission, and save power using the minimum bandwidth when no data is received.

DESCRIPTION OF DRAWINGS

FIGS. 5A to 5C are exemplary diagrams for explaining power saving depending on a CBPS mode when data is transmitted between an access point and a first terminal and a second terminal, according to the present invention.

FIG. 9 is a graph illustrating a simulation result of analyzing a power saving effect when the CBPS scheme according to the present invention is applied.

MODE FOR THE INVENTION

Figure 1:
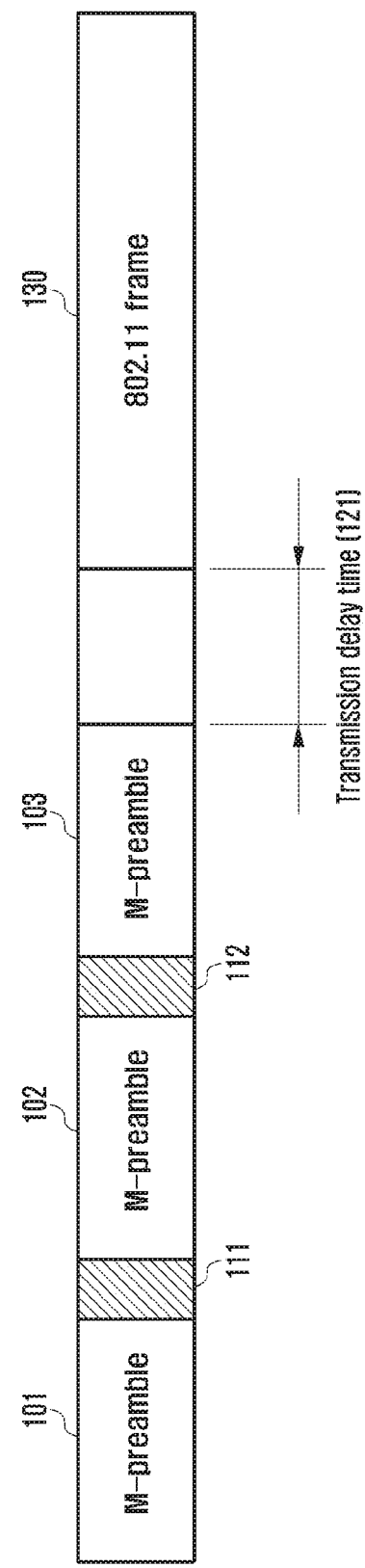
FIG. 1 is a structure diagram of a frame for applying a down clocking scheme.

Hereinafter, various embodiments will be described in detail with reference to the accompanying drawings. At this point, it is to be noted that like reference numerals denote like elements in the accompanying drawings. Further, the accompanying drawings of the present invention are provided to help understanding of the present invention and therefore it is to be noted that the present invention is not limited to forms, dispositions, etc., illustrated in the drawings of the present invention. Further, detailed descriptions related to well-known functions or configurations will be ruled out in order not to unnecessarily obscure the subject matter of the present invention. It is to be noted that only parts necessary to understand operations according to various embodiments of the present invention will be described below and the description of other parts will be omitted so as not to unnecessarily obscure the subject matter of the present invention.

Hereinafter, various types of schemes for power saving proposed to date in a wireless LAN system will be described briefly.

A method for power saving of a multiple antenna proposed in the IEEE 802.11n standard requires an operation to turn on/off an antenna positively necessary for realizing SMPS in a short time in real time. However, it is difficult to realize a commercial chip to perform the operation, and as a result there is no case where the method is applied to an actual commercial product. In addition, due to the recent trend of a portable terminal aiming at a small form factor, the number of multiple antennas equal to or smaller than two is mounted, and therefore there is a problem in that a power saving scheme using an antenna control is difficult to expect great performance improvement.

As another technology for power saving in a wireless LAN system, there is a method for dynamically allocating a bandwidth at an access point (AP). The method is a method for power saving by changing a clock so that the bandwidth may be dynamically allocated for power saving upon transmission and reception of data depending on a transmission rate of the terminal accessing a wireless AP.

However, the method for power saving using the bandwidth control needs to control the bandwidth. Therefore, the power needs to be saved by controlling the bandwidth upon the transmission and reception of data in consideration of a current transmission rate, which causes the problem of reducing the transmission rate to rather lower efficiency from the viewpoint of energy efficiency (J/bit). Further, other schemes for controlling a bandwidth are mostly used for improving throughput or protocol efficiency, or devices for narrowband communication while avoiding interference have been developed.

As another method, a scheme of finding out an optimal bandwidth using a down clocking method for lowering a clock to increase power efficiency under the IEEE 802.11a environment has been proposed in recently released articles. However, the method only controls the bandwidth using channel information to increase the transmission efficiency, but does not greatly contribute to power saving. Other studies have proposed a scheme for controlling a bandwidth by appropriately performing down clocking upon the transmission and reception of data or reducing power consumption of the wireless LAN by efficiently performing the down clocking in an idle state of a channel.

Hereinafter, a down clocking scheme will be briefly described with reference to the accompanying drawings. FIG. 1 is a structure diagram of a frame for applying a down clocking scheme.

Referring to FIG. 1, the frame defined in the IEEE 802.11 standard is a frame 130. The frame includes preambles (M-preambles) 101, 102, and 103 consisting of predefined specific sequences in front of the 802.11 frame 130 for using the down clocking scheme, and predetermined time intervals 111 and 112 are present between the respect preambles.

Briefly describing the operation method, a terminal supporting 802.11 maintains a down clocking state. At this point, if there is data to be transmitted to the corresponding terminal by the access point (AP), to notify destination information and packets to be transmitted to the terminal in the down clocking state, the preambles 101, 102, and 103 and the intervals between the preambles are determined and transmitted to the terminal operating as the down clocking. The terminal that has received the preambles 101, 102, and 103 and the intervals between the preambles releases the down clocking state and is transitioned to a normal clocking operation.

In this way, a transmission delay time 121 is required by timing taken for a transition to a normal operation. Thereafter, the terminal may receive data by transmitting the frame defined in the IEEE 802.11.

However, the down clocking method greatly violates the standard because a preamble and packet detection method needs to be modified from the existing standard contents. In addition, when the down clocking method is applied to the channel bonding technique, a coexistence problem with the existing devices is caused. In particular, since the access point (AP) needs to transmit control frames for preventing interference, for example a ready to send (RTS) frame or/and a clear to send (CTS) frame or/and a beacon frame for notifying presence of the access point, or the like in a structure of a legacy frame that an IEEE 802.11a/g node may transmit and receive, the corresponding technology may not receive an important frame.

In addition, the following methods have been proposed as the scheme of controlling a bandwidth. First, there has been proposed a technology for a low power consumption wireless data transmitting apparatus capable of performing a long distance wireless transmission by finding out a narrow-band channel suitable for stable communication in consideration of fluctuating jamming or noise. Second, a technology of allocating a bandwidth and transmit power of a wireless communication system as much as possible within exceeding an interference temperature limit value has been proposed. Further, technologies for managing a bandwidth of an antenna of a wireless communication system by controlling a total resistance value of the antenna have been proposed.

However, these technologies are not only difficult to actually apply in a current wireless LAN system, but the predefined technologies have not been used in a commercial system. In addition, even if the technologies are applied, it is difficult to expect higher performance improvement, and a coexistence problem with the existing technology may occur, which may rather cause a performance deterioration that is difficult to expect.

Therefore, the present invention to be described below discloses a technology for power saving of a terminal that may be actually applied to a wireless LAN system by newly defining some contents that are not defined in the standard while observing the standard protocol.

First, according to the present invention, a channel bonding power save (CBPS) action frame is defined for a bandwidth control scheme agreement in a wireless LAN system in which two or more bands are channel-bonded.

Second, the present invention proposes a dynamic channel bonding power save scheme that reflects characteristics of a wireless LAN chipset with a fast bandwidth control rate.

Third, the present invention proposes a pseudo dynamic channel bonding power save scheme that reflects characteristics of a wireless LAN chipset with a slow bandwidth control speed.

Fourth, the present invention discloses contents of an information element for management of a terminal supporting the channel bonding power save (CBPS).

In order to apply the channel bonding power save (CBPS) scheme according to the present invention, an agreement on whether to use the CBPS scheme between the access point (AP) and a terminal (station, STA) should be made in advance. The agreement should be made during an association between the access point and the terminal, and needs to be opportunistically made afterwards. Therefore, in order to apply the CBPS method according to the present invention, the terminal needs to transmit information on an operation mode depending on STA's capability information.

When the agreement on whether the access point uses the terminal and the CBPS scheme according to the present invention is made, the access point may use the control frame to provide information on whether to use the CBPS scheme. The control frame may be a beacon frame. Accordingly, according to the present invention, the information described in the following Table 1 may be transmitted by being included in the beacon frame.

TABLE 1

| Information | Contents |
| --- | --- |
| CBPS enable | Set to 0 if CBPS not supported<br>Set to 1 if CBPS supported |
| CBPS Mode | Set to 0 for Dynimic CBPS<br>Set to 1 for Pseudo-Dynimic CBPS |
| maximum bandwidth switching delay exponent | The Field is an integer in the range 0 to 3<br>The delay defined by this field is equal to 16*(12 + Maximum bandwidch switching delay exponent) |

In the above information, a CBPS enable field is a field notifying whether to perform the channel bonding power save operation according to the present invention. The case where the CBPS enable field is set to be "0" may be a case where the CBPS scheme according to the present invention is not supported and the case where the CBPS enable field is set to be "1" may be a case where the CBPS scheme according to the present invention is supported. Further, a CBPS mode field is a field for identifying a dynamic mode and a pseudo-dynamic mode. When the CBPS mode field is set to be "0", the terminal may be set to be operated in the dynamic mode and when the CBPS mode field is set to be "1", the terminal may be set to be operated in the pseudo-dynamic mode. The dynamic mode and the pseudo-dynamic mode are set depending on the bandwidth control rate of the wireless LAN chipset as briefly described above.

Next, the structure of the frame for notifying the base terminal of a CBPS action method according to the present invention will be described.

Figure 2:
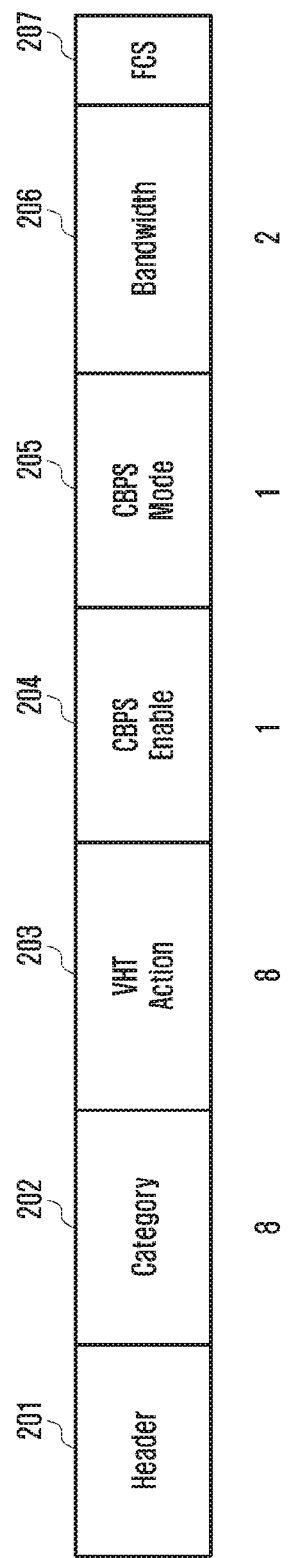
FIG. 2 is an exemplary diagram illustrating a structure of a channel bonding power save action frame according to the present invention.

FIG. 2 is an exemplary diagram illustrating a structure of a channel bonding power save action frame according to the present invention.

The CBPS action frame illustrated in FIG. 2 may use a management frame defined in the wireless LAN system. Referring to FIG. 2, the CBPS action frame includes a header 201, a category 202, a VHT action 203, a CBPS enable 204, a CBPS mode 205, a bandwidth 206, and an FCS 207.

Here, the category field 202 and the VHT action field 203 may consist of 8 bits, and may indicate that a CBPS field is located after two fields or that other fields are located. The CBPS enable field 204 is a field for notifying whether or not the terminal may perform the CBPS operation according to the present invention and may consist of 1 bit. For example, if the CBPS enable field 204 is set to be "0", the terminal does not use the CBPS but continuously uses an operating bandwidth that is always determined by a scheme of selecting an operating bandwidth of the access point or another bandwidth. On the other hand, when the CBPS enable field 204 is set to be "1", the terminal uses the CBPS and the terminal uses the bandwidth, which is determined by the scheme of selecting an operating bandwidth of the AP or another bandwidth, only for transmission and reception of the terminal itself and is operated at a minimum bandwidth (20 MHz) for the remaining time. Here, it is apparent that bits may also be set conversely.

In addition, the CBPS mode field 205 according to the present invention is a field for defining a mode of the CBPS and may consist of 1 bit. The CBPS mode may be divided into a dynamic mode and a pseudo-dynamic mode as briefly described above and the dynamic mode and the pseudo-dynamic mode are set depending on the bandwidth control rate of the wireless LAN chipset as briefly described above. That is, the terminal may set "0" or "1" depending on its own bandwidth switching rate. For example, when the CBPS mode field 205 is set to be "0", the terminal may be set to be operated in the pseudo-dynamic mode and when the CBPS mode field 205 is set to be "1", the terminal may be set to be operated in the dynamic mode. If a bandwidth switching delay is equal to or less than 16 μsec (micro second), the terminal may be set in the dynamic CBPS mode, and otherwise, in the pseudo-dynamic CBPS mode. The reason why the time is set to be 16 μsec is that standby time (SIFS) after the transmission of each frame in the wireless LAN system is 16 μsec. Therefore, the above time may be set to have different values according to the appointment. It is apparent to those skilled in the art that bit setting information of the fields of the CBPS mode may be set in opposition to the above example.

Next, the bandwidth field 206 becomes information for indicating one of a minimum bandwidth of 20 MHz, 40 MHz that is the bonding of two bandwidths, 80 MHz that is the bonding of four bandwidths, and 160 MHz that is the bonding of up to eight bandwidths. Therefore, the bandwidth field 206 may consist of 2 bits and indicates 20 MHz when the 2 bits are "00", 40 MHz when the 2 bits are "01", 80 MHz when the 2 bits are "10", and 160 MHz when the 2 bits are "11". Further, it is also apparent that if the types of bandwidths are increased, the number of bits of the bandwidth field 206 may be increased to indicate more bandwidths.

Finally, a frame check sequence (FCS) field may be located at an end of the CBPS frame.

The CBPS action frame described above is also used for the agreement but may also be used for the access point to instruct the terminal to change the bandwidth in the pseudo-dynamic CBPS mode. In this case, the bandwidth field 206 refers to a bandwidth to be changed.

Figure 3:
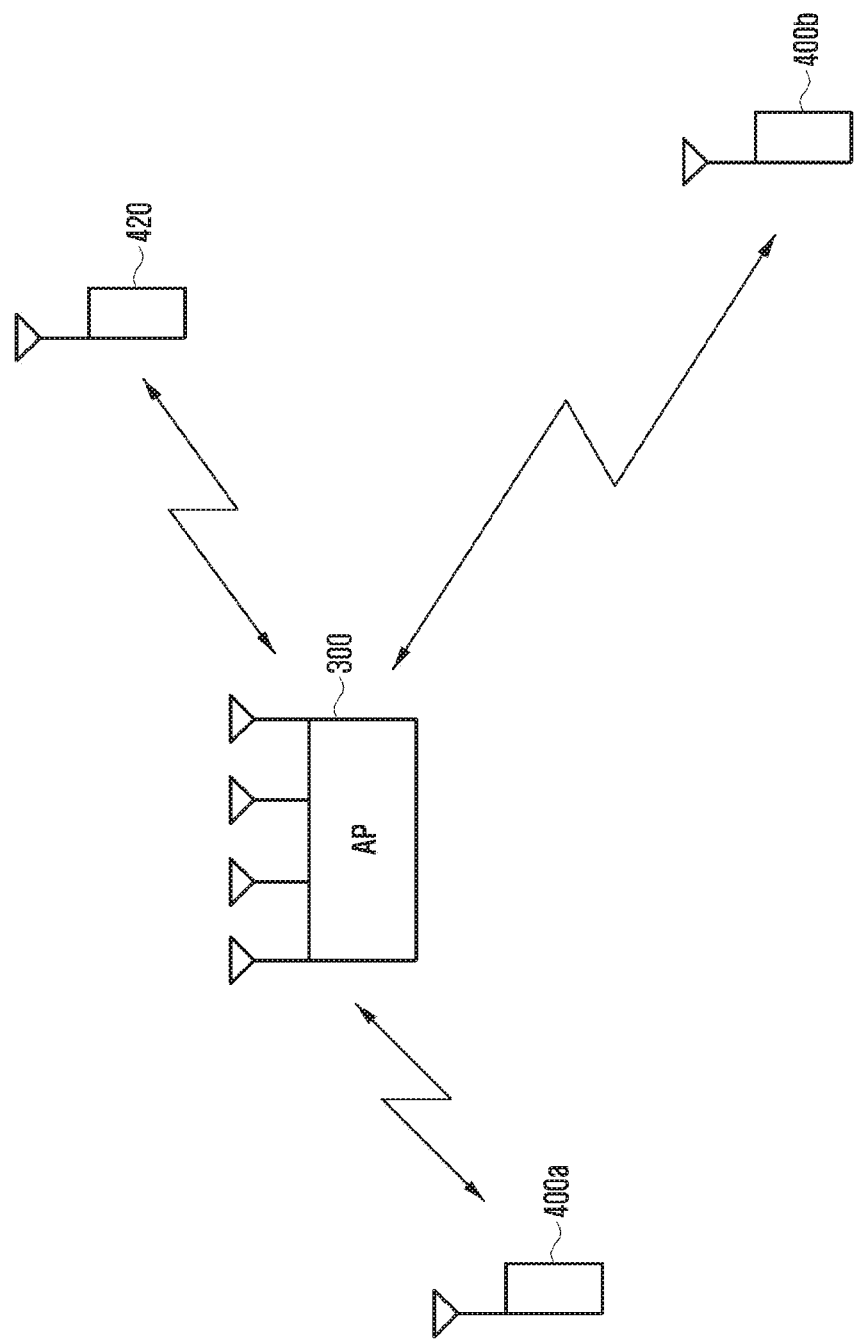
FIG. 3 is an exemplary diagram illustrating a situation where a dynamic terminal and a pseudo-dynamic terminal to which the present invention is applied and a terminal to which the present invention is not applied are mixed in a wireless LAN system.

FIG. 3 is an exemplary diagram illustrating a situation where a dynamic terminal and a pseudo-dynamic terminal to which the present invention is applied and a terminal to which the present invention is not applied are mixed in a wireless LAN system.

Referring to FIG. 3, an access point 300 is a node capable of applying the channel bonding power save (CBPS) scheme according to the present invention, and it is assumed that a first terminal (STA1) 400a is a dynamic terminal, a second terminal (STA2) 400b is a pseudo-dynamic terminal, and a third terminal (STA3) 420 is a terminal to which the present invention is not applied.

According to the present invention, as described above, the access point 300 may transmit the beacon frame including the information as shown in Table 1 or transmit the CBPS action frame. Then, the first terminal 400a and the second terminal 400b to which the present invention is applied may each set the CBPS action frame described with reference to FIG. 2 and provide the CBPS action frame to the access point 300. At this point, since the first terminal 400a is the dynamic terminal, the first terminal 400 sets the CBPS mode field 205 to notify the CBPS mode field 205 that it is the dynamic terminal and transmits the CBPS action frame to the access point 300. Alternatively, the above information may also transmit to the access point 300 using a management frame like association request/probe request. Further, since the second terminal 400b is the pseudo-dynamic terminal, the second terminal 400b notifies the CBPS mode field 205 that it is the pseudo-dynamic terminal and transmits the CBPS action frame to the access point.

Finally, since the third terminal 420 is a terminal to which the present invention is not applied, it becomes a terminal that does not transmit the CBPS action frame to the access node 300.

Figure 4:
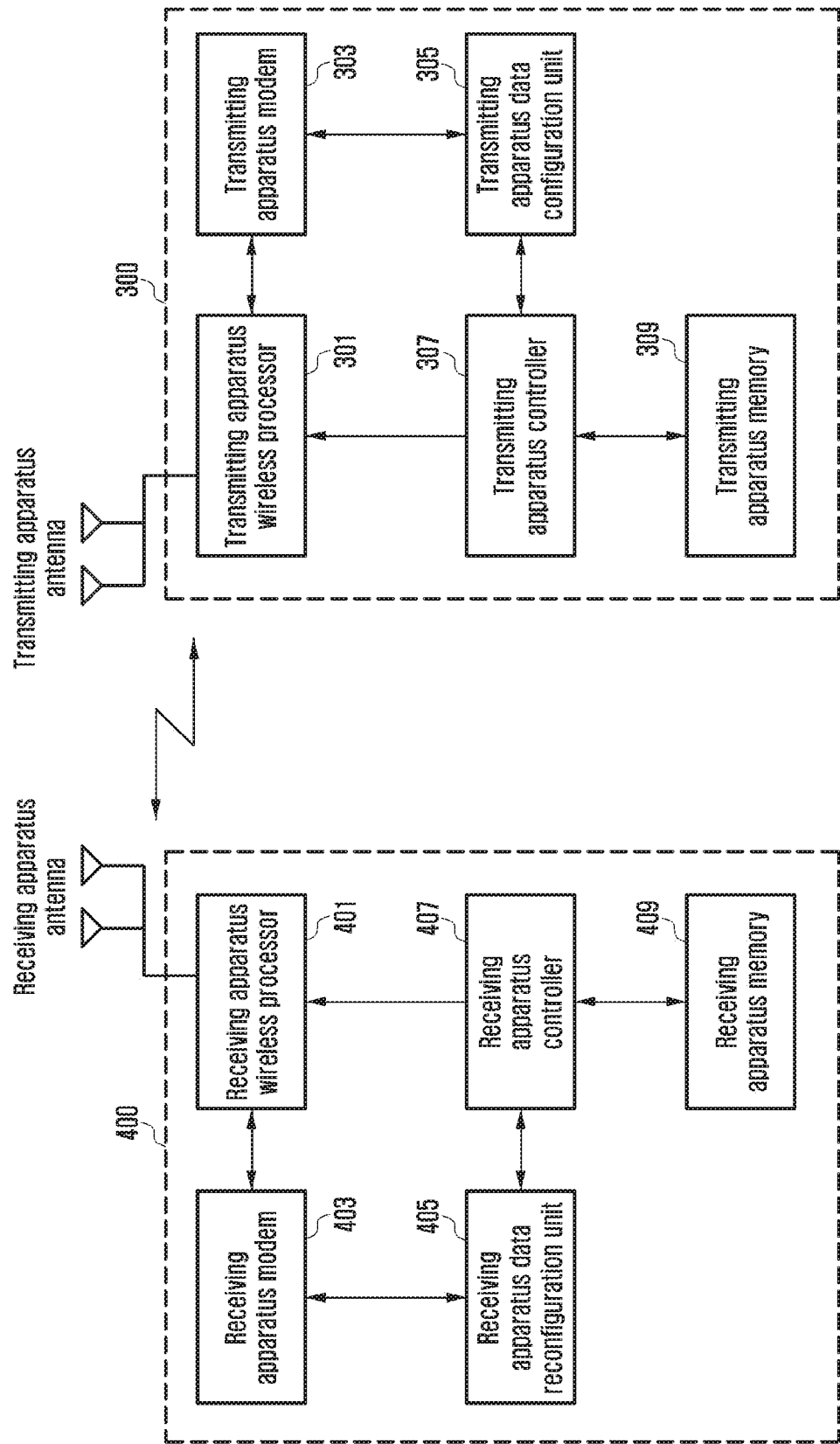
FIG. 4 is a diagram illustrating a functional internal block configuration of the terminal to which the present invention is applied and a functional internal block configuration of an access point.

FIG. 4 is a diagram illustrating a functional internal block configuration of the terminal to which the present invention is applied and a functional internal block configuration of an access point.

Referring to FIG. 4, a transmitting apparatus is assumed to be the access point 300 and a receiving apparatus is assumed to be the terminal 400. Further, it should be noted that the terminal is the first terminal 400a and the second terminal 400b as the terminal to which the present invention is applied and reference numerals therefor are denoted by 400.

The transmitting apparatus 300 includes a transmitting apparatus radio processor 301, a transmitting apparatus modem 303, a transmitting apparatus data configuration unit 305, a transmitting apparatus controller 307, and a transmitting apparatus memory 309.

The transmitting apparatus radio processor 301 may convert a signal received from the transmitting apparatus antenna into a baseband signal and provide the baseband signal to the transmitting apparatus modem 303, and the transmitting apparatus radio processor 301 may up-convert data received from the transmitting apparatus modem 303 into a predetermined band to be radiated to the atmosphere through the transmitting apparatus antenna. At this point, if the transmitting apparatus antenna includes a plurality of antennas and beamforming is required, beamforming factors may be combined to form a beam in a specific direction and radiate the beam.

The transmitting apparatus modem 303 may demodulate and decode the signal received from the transmitting apparatus radio processor 301, and convert an analog signal into a digital signal and provide the digital signal to the transmitting apparatus data configuration unit 305. Further, the transmitting apparatus modem 303 may encode and modulate digital data received from the transmitting apparatus data configuration unit 305, and convert the digital data into analog data and output the analog data to the transmitting apparatus radio processor 301.

If the data to be transmitted is received from a high position (not illustrated in FIG. 4), the transmitting apparatus data configuration unit 305 divides and outputs the data depending on a band and a transmission rate set by the control of the transmitting apparatus controller 307.

According to the present invention, the transmitting apparatus controller 307 performs a control to provide each terminal with whether the CBPS is set through the control frame, and stores in the transmitting apparatus memory 309 necessary information, for example, CBPS activation information, CBPS mode information and the like when receiving the CBPS action frame from a specific terminal. When communication with the corresponding terminal is required, that is, when data is received from the corresponding terminal or are transmitted to the corresponding terminal, communication is performed based on the stored CBPS action frame information.

The transmitting apparatus memory 309 receives and stores information on terminals located in the access point, and includes an area for storing control information for driving the access point. In addition, the transmitting apparatus memory 309 may include an area for temporarily storing information generated upon the control by the transmitting apparatus controller 307, or the like. The transmitting apparatus memory 309 may have other storage areas, but an additional description of parts not associated with the present invention will be omitted.

Next, the receiving apparatus 400 will be described. The receiving apparatus 400 includes a receiving apparatus radio processor 401, a receiving apparatus modem 403, a receiving apparatus data reconfiguration unit 405, a receiving apparatus controller 407, and a receiving apparatus memory 409.

The receiving apparatus radio processor 401 may perform the same operation as the transmitting apparatus radio processor 301 described above. The receiving apparatus radio processor 403 may convert a signal received from the receiving apparatus antenna into a baseband signal and provide the baseband signal to the receiving apparatus modem 403, and the receiving apparatus radio processor 301 may up-convert data received from the receiving apparatus modem 303 into a predetermined band to be radiated to the atmosphere through the receiving apparatus antenna. At this point, if the receiving apparatus antenna includes a plurality of antennas and beamforming is required, beamforming factors may be combined to form a beam in a specific direction and radiate the beam.

The receiving apparatus modem 403 may demodulate and decode the signal received from the receiving apparatus radio processor 401, and convert an analog signal into a digital signal and provide the digital signal to the transmitting apparatus data reconfiguration unit 405. Further, the receiving apparatus modem 405 may encode and modulate digital data received from the receiving apparatus data reconfiguration unit 405, and convert the digital data into analog data and output the analog data to the transmitting apparatus radio processor 401.

If the data to be transmitted is received from a high position (not illustrated in FIG. 4), the receiving apparatus data reconfiguration unit 405 divides and outputs the data depending on a band and a transmission rate set by the control of the receiving apparatus controller 407.

The receiving apparatus controller 407 receives whether the CBPS is set through the control frame according to the present invention, generates the CBPS action frame, and performs a control to transmit the CBPS action frame to the access point. That is, when generating the CBPS action frame, the receiving apparatus controller 407 performs a control to generate and transmit the CBPS activation information and the CBPS mode information depending on the capability of the terminal. In addition, the receiving apparatus controller 407 may perform the overall operation control of the receiving apparatus.

The receiving apparatus memory 409 may store control information for the operation of the receiving apparatus and information for the operation of the CBPS mode and the configuration of the CBPS action frame according to the present invention. Further, the receiving apparatus memory 409 may have other storage areas, but an additional description of parts not associated with the present invention will be omitted.

FIGS. 5A to 5C are exemplary diagrams for explaining power saving depending on a CBPS mode when data is transmitted between an access point and a first terminal and a second terminal, according to the present invention.

It should be noted that some sections of the last parts of FIGS. 5A to 5C are illustrated overlapping each other, for convenience of understanding.

Referring to FIG. 5A, the access point 300 transmits a CBPS action frame 501 according to the present invention to the second terminal 400b from timing t00 to timing t01. At this point, it is assumed that the access point 300 knows in advance that the second terminal is the pseudo-dynamic terminal as described with reference to FIG. 3. Further, the access point 300 provides bandwidth information for channel bonding through the CBPS action frame 501.

Accordingly, if the second terminal 400b receives the CBPS action frame 501 from the timing t00 to the timing t01, the second terminal 400b waits from the timing t01 to timing t02 and then may transmit an acknowledgement (ACK) signal 502 from the timing t02 to timing t03. Here, time from the timing t01 to the timing t02 may be SIFS time defined in the wireless LAN system.

Further, the second terminal 400b maintains a power saving state where only one band is checked as indicated by reference numeral 560, and then increases the bandwidth of the wireless LAN chipset to allow the access point to receive data transmitted through the data channel bonding while transmitting the acknowledgment signal 502. At this point, the bandwidth increases to the state where the access point 300 may receive the band as indicated in the CBPS action frame, in the form of transmitting and receiving only one band as indicated by reference numeral 560. The switching time for the bandwidth increase may range from the timing t03 to timing t04.

Since the access point 300 knows in advance that the second terminal 400b is the pseudo-dynamic terminal and knows the time taken for the bandwidth increase, the access point 300 may transmit in a frame format defined in the wireless LAN system data 503 to be transmitted to the second terminal through the band indicated in the CBPS action frame 501 from the timing t04 when the bandwidth increase is completed to timing t05. At this point, if there is additional data to be transmitted to the second terminal 400b, the access point 300 may notify that there is the additional data. Here, it should be noted that this is indicated by "More Data=1" in FIG. 5A.

Then, the second terminal 400b may receive the data frame 503 from the timing t04 to the timing t05, wait from the timing t05 to timing t06 after receiving the received data frame 503, and then transmit an acknowledgment signal 504 to the access point from the timing t06 to timing t07. Here, the time from t05 to t06 may be the SIFS time described above. At this point, the second terminal 400*b* is driven by extending the bandwidth of the wireless LAN chipset to accommodate the bandwidth indicated by the access point 300. That is, the power consumption of the second terminal 400*b* increases in the state where the bandwidth is extended as shown by reference numeral 531.

Further, the first terminal 400*a* is not in communication with the access point, and therefore is in a state of checking only the minimum band. That is, the first terminal 400*a* performs a low power mode in which only the minimum bandwidth is checked. Reference numeral 550 in FIG. 5A indicates the bandwidth of the first terminal 400*a*. Since the reference number 550 checks only the minimum bandwidth like reference numeral 521, the first terminal 400*a* can save power consumption.

FIG. 5A illustrates a case where there is data to be transmitted to the first terminal 400*a* before the access point 300 transmits additional data to the second terminal 400*b* after transmitting data to the second terminal 400*b*. Therefore, a case where the access point 300 transmits a transmission ready (RTS) frame 505 to the first terminal 400*a* from timing t08 to timing t09 is illustrated.

Then, after receiving the RTS frame 505 from the access point 300, the first terminal 400*a* waits from the timing t09 to timing t10 that is the SIFS time and then may transmit a reception ready complete (CTS) frame 506 to the access point 300 from the timing t10 to timing t11.

At this point, the second terminal 400*b* may hear the RTS frame 505 that the access point 300 transmits to the first terminal 400*a*. Since the RTS frame includes a data transmission time and destination information, the second terminal 400*b* does not have to maintain a high bandwidth for the time when the communication between the access point 300 and the first terminal 400*a* is made. That is, since data is not received through the channel bonding, the second terminal 400*b* does not wait for data reception from a lot of bands as denoted by reference numeral 531, but maintains a state of checking only the minimum band like reference numeral 532, thereby saving the power consumption of the terminal.

Accordingly, the second terminal 400*b* receives the RTS frame 505 to be transitioned to the state where only the minimum band is checked for the time indicated to perform the communication of the first terminal 400*a* with the access point in the RTS frame 505, thereby saving the power consumption. Accordingly, the second terminal 400*b* can switch the wireless LAN chipset from the timing t09 to the timing t11 to be transitioned to a state of receiving only the minimum band. Generally, the wireless LAN chipset has different switching rates in the case of raising the bandwidth and in the case of lowering the bandwidth, in which the lowering rate of the band is faster. Therefore, FIG. 5A illustrates that a slope from the timing t09 to the timing t11 is sharp than that from the timing t03 to the timing t04.

Further, in the above example, it should be noted that the timing t11 and timing t12 may differ from those illustrated in FIGS. 5A and 5B. That is, since the timings are determined depending on the rate of the wireless LAN chipset of the terminal, a context between the timings may be changed.

Next, a description will be made with reference to FIG. 5B. As described with reference to FIG. 3, the first terminal 400*a* is a terminal supporting the dynamic CBPS mode. The access point 300 knows in advance that the first terminal is a terminal supporting the dynamic CBPS mode. Therefore, if the first terminal 400*a* transmits a CTS frame 506 from the timing t10 to the timing t12, the access point 300 may configure data to be transmitted to the first terminal 400*a* from timing t14 to the timing t16 as a data frame 507 depending on the standard protocol of the LAN system and transmit the data.

Further, the first terminal 400*a* may switch the wireless LAN chipset from the timing t 12 to timing t13 earlier than the timing from the timing t12 to the timing t14 defined as the SIFS timing. At this point, the timing t13 and the timing t14 may be the same timing or may also be before the timing t14 as illustrated in FIG. 5B.

Therefore, the first terminal 400*a* may receive a data frame 507 through the band indicated by the access point 300 like reference numeral 522 from the timing t14 to timing t16. In this way, the first terminal 400*a* is not in a power saving state while receiving the data frame 507. Thereafter, the first terminal 400*a* waits from the timing t16 to timing t18 and then transmits an acknowledgment (ACK) signal 508 to the access point 300 from the timing t18 to timing t19. At this point, the first terminal 400*a* may switch the wireless LAN chipset from timing t17 between the timing t16 and the timing t18 so as to check only the minimum bandwidth of 20 MHz. Therefore, the first terminal 400*a* may be transitioned to the power saving state before transmission of the acknowledgment (ACK) signal 508.

Meanwhile, since the second terminal 400*b* knows the rising time of the bandwidth in advance, the bandwidth should be increased in advance at the timing before the communication between the first terminal 400*a* and the access point 300 is completed. FIG. 5B illustrates the case where the bandwidth increases from the timing t15 to timing t18*f* is exemplified. This is because the second terminal 400*b* knows in advance the switching rate of the wireless LAN chipset of the second terminal 400*b* as described above and therefore is transitioned from the access point 300 to the state where the data may be received at the timing when the transmission and reception of data between the first terminal 400*a* and the access point 300 is completed.

Next, the case where the access point 300 transmits an additional data frame to the second terminal 400*b* will be described with reference to FIG. 5C.

When receiving the acknowledgment (ACK) signal 508 from the first terminal 400*a* from the timing t18 to the timing t19, the access point 300 waits from the timing t19 to timing t20 and then may configure data to be transmitted to the second terminal 400*b* from the timing t20 to timing t21 as a data frame 509 depending on the wireless LAN standard format and transmits the data.

In this case, as described above, the second terminal 400*b* performs the power saving mode for receiving only the minimum band of 20 MHz and then is transitioned to the state where the bandwidth may be increased to receive in advance data as much as the band promised with the access point 300 from the timing t18. Further, the first terminal 400*a* is transitioned to the power saving mode receiving only the band of 20 MHz that is the minimum band.

Accordingly, the second terminal 400*b* waits from timing t21 to timing t22 that is the SIFS time after receiving the data frame 509 from the timing t20 to the timing t21, and then transmits an acknowledgment (ACK) signal 510 from time t22 to timing t23. At this point, since the access point 300 sets and transmits "More Data=0" indicating that there is no additional data in the data frame 509 to be transmitted to the second terminal 400*b*, the second terminal 400*b* may switch the wireless LAN chipset to monitor only the minimum band from timing t23 to timing t24. Thereby, the terminals using the CBPS scheme communicating with the access point 300 may receive data transmitted through the channel bonding only during the data communication and monitor only 20 MHz in a legacy wireless LAN communication system that does not use the channel bonding in other situations, thereby reducing the power consumption.

Next, the operations described above will be described briefly.

The dynamic CBPS is used for a terminal with relatively short bandwidth switching delay time. Further, the terminal agreed with the access point 300 in the dynamic CBPS mode through the CBPS action frame is first configured to perform sensing only in a primary channel bandwidth of 20 MHz. Here, the "primary channel bandwidth" may be referred to as a "primary band", and may generally be a standard band that provides the legacy 20 MHz. However, if necessary, a band other than the legacy 20 MHz band may be set as a reference band and may be used. Therefore, if the terminal itself has the data frame to be transmitted, it may switch upward bandwidth switching in an operating bandwidth agreed with an original AP and may transmit the data frame. On the other hand, in order to transmit information to the terminal operated in the dynamic CBPS mode, the access point 300 needs to first transmit and receive a transmission initiate frame such as RTS/CTS. The frame may be transmitted in a duplicated form of a legacy PLCP protocol data unit (PPDU) of 20 MHz. If the terminal that is a receiving end uses the dynamic CBPS, the frame is prepared to be received after the upward bandwidth switching to an original operating bandwidth within 16 μsec. After the reception is terminated in the changed operating bandwidth, the acknowledgment frame is transmitted after downward bandwidth switching to the bandwidth of 20 MHz again, which is the minimum bandwidth, within 16 μsec to terminate a data transmission sequence.

In addition, an algorithm for efficiently operating the CBPS depending on the capability information of the access point 300 (AP's capability information) is possible. As an example, the access point 300 may select whether to switch the upward bandwidth in terms of overhead or energy efficiency. That is, if the frame size is so small that a transmission rate gain obtained by the upward switching is less than the overhead increment, the access point may abandon the bandwidth switching and perform the transmission to the legacy PPDU of 20 MHz format. The determination of the condition may be determined using Equation (1) below $$T_{Data}(r_{20})+T_{ACK}+SIFS>T_{RTS}+T_{CTS}+T_{Data}(r_{80})+T_{ACK}+3SIFS \quad \text{[Equation 1]}$$

In the above Equation 1, $T_{Data}$ (r20) is the data transmission time in the case of a bandwidth of 20 MHz, $T_{ACK}$ is the transmission time of the acknowledgment frame, and SIFS generally becomes 16 μsec as the time defined in the wireless LAN system. Further, the $T_{RTS}$ is the transmission time of the RTS frame, and $T_{CTS}$ is the transmission time of the CTS frame. $T_{ACTION}$ in Equation 2 below is the transmission time of the CBPS action frame, and $T_{Data}$ (r80) is the data transmission time in the case of a bandwidth of 80 MHz. In the right side of the above Equation 1, the reason why the interval (SIFS) between the frames is three times is that the RTS, the CTS and the data frames are transmitted at the SIFS time interval.

The above Equation 1 illustrates a condition for determining whether to switch the upward bandwidth (20 MHz→80 MHz). However, the switching to 40 MHz and the switching to 160 MHz may also be determined by the same method based on the above Equation 1.

Next, the operation in the pseudo-dynamic CBPS mode will be described. In the pseudo-dynamic CBPS mode, a terminal with a relatively long bandwidth switching delay time is used. Further, the terminal agreed with the access point 300 in the pseudo-dynamic CBPS mode through the CBPS action frame performs the sensing only in the primary channel bandwidth of 20 MHz. In addition, if the terminal itself has the data to be transmitted, it is changed to the operating bandwidth agreed with the original access point 300 and then performs the transmission. On the other hand, in order to transmit information to the terminal operated in the pseudo-dynamic CBPS mode, the access point first uses the CBPS action frame as the initiate frame before transmitting the transmission data frame. At this point, the NAV needs to be defined in consideration of the switching delay time.

Meanwhile, unlike the dynamic CBPS mode, lowering the bandwidth back to the minimum bandwidth is determined by the following three conditions.

(1) When the CBPS action frame requiring the downward switching is received, (2) when More Data bit of a frame control field is 0, and (3) when the receiving terminal currently receiving the frame is another terminal and the transmission time of the corresponding frame is very long (determined to be a duration of a control filed of the RTS frame), the terminal proactively switches the bandwidth.

Further, for the upward bandwidth switching, the same operation as that of the dynamic CBPS is performed, and the condition for determining whether to switch the bandwidth (20 MHz→80 MHz) is expressed by the following Equation 2.

$$T_{Data}(r_{20})+T_{ACK}+SIFS>D_{UP}+D_{down}+T_{Action}+T_{Data}(r_{80})+2T_{ACK}+3SIFS \quad \text{[Equation 2]}$$

Next, a definition of an information element will be described. The present invention requires an information field (information element) for managing the content of the agreement between the access point and the terminal. For example, the information field may be included in HT or VHT capabilities Field of the IEEE 802.11 standard, and the content included in the information field may be the contents of Table 1 described above. Referring back to the contents of the above Table 1, the access point can support different CBPS operations to different terminals, and the maximum delay time may be determined by the maximum bandwidth switching delay. Therefore, the NAV value may be determined in the pseudo-dynamic mode based on the maximum delay time information.

Figure 6:
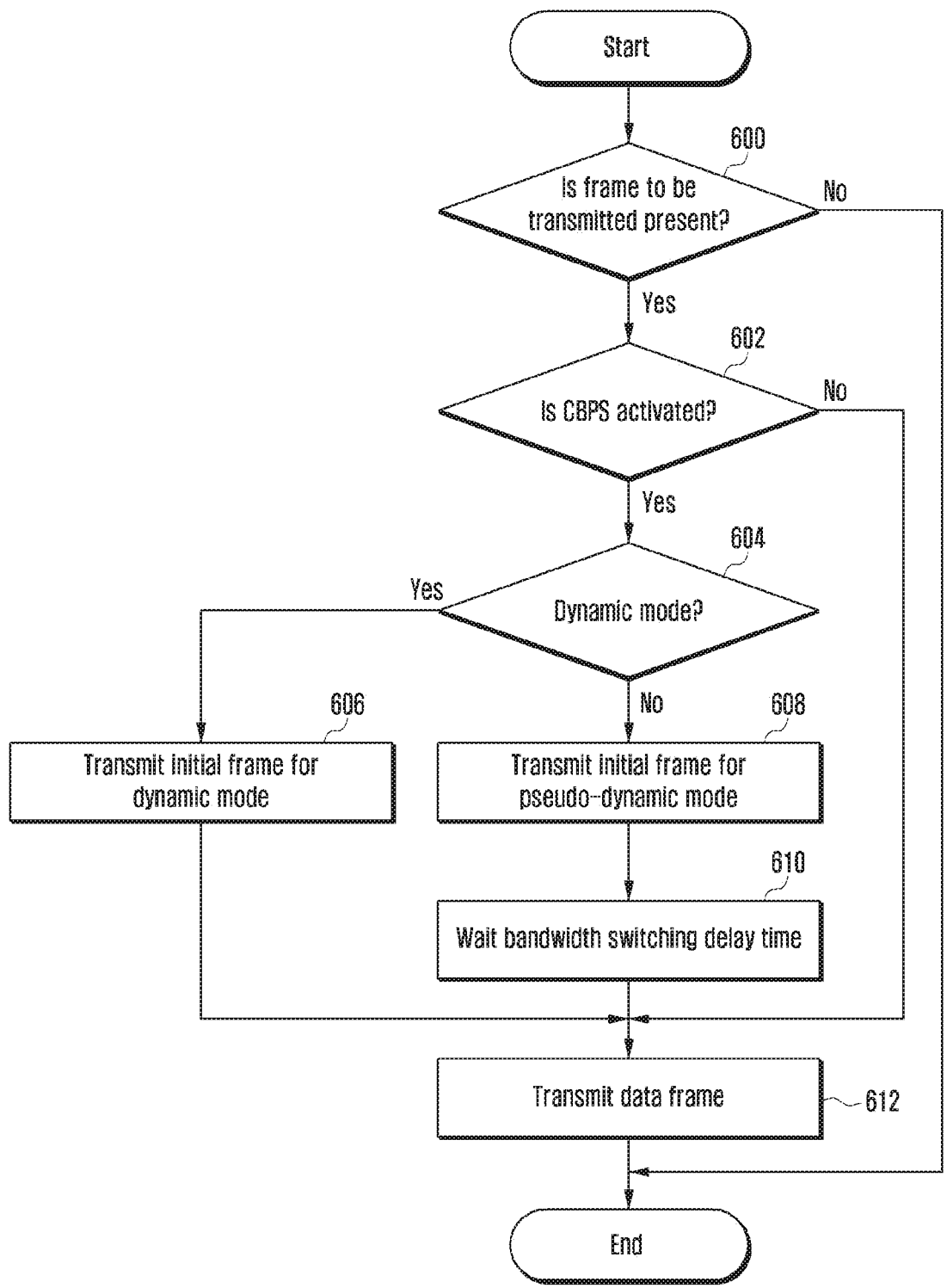
FIG. 6 is a control flow chart upon transmission of data from an access point supporting the CBPS scheme according to the present invention to a terminal.

FIG. 6 is a control flow chart upon transmission of data from an access point supporting the CBPS scheme according to the present invention to a terminal.

Describing FIG. 6 in the following description, it is assumed that the transmitting apparatus 300 of FIG. 4 is the access point.

If there is a frame to be transmitted in step 600, the transmitting apparatus controller 307 proceeds to step 602 to allow a target terminal to check whether the CBPS is in an activated state within the current access point. As the check result of the step 602, if it is determined that the CBPS is not activated, the transmitting apparatus controller 307 proceeds to step 612 and transmits data according to the legacy wireless LAN standard.

On the other hand, if it is determined as the check result in the step 602 that the CBPS is activated, the transmitting apparatus controller 307 proceeds to step 604 to check whether the corresponding terminal is in the dynamic mode. As illustrated in FIGS. 5A to 5C described above, the check indicates the state where the access point in advance has the information on the dynamic mode or the pseudo-dynamic mode for each terminal. Therefore, in step 604, checking whether the corresponding terminal is in the dynamic mode may be an operation to check information stored in the transmission apparatus memory 309.

As the check result of the step 604, if it is determined that the corresponding terminal is in the dynamic mode, the transmitting apparatus controller 307 proceeds to step 606 to control the transmitting apparatus data configuration unit 305, the transmitting apparatus modem 303, and the transmitting apparatus radio processor 301, thereby controlling an initial frame transmission for dynamic mode. Thereafter, the transmitting apparatus controller 307 may transmit the data frame in step 612. At this point, the transmission of the data frame may be performed by determining in advance the bandwidth and the like depending on the amount, the transmission rate and the like of data.

On the other hand, if it is determined as the check result in the step 604 that the corresponding terminal is not in the dynamic mode, the transmitting apparatus controller 307 proceeds to step 608. Here, the proceeding to step 608 may mean that the corresponding terminal may be in the pseudo-dynamic mode. Therefore, in the step 608, the transmission apparatus controller 307 controls the transmission apparatus data configuration unit 305, the transmission apparatus modem 303, and the transmission apparatus radio processor 301 to generate the initial frame for the pseudo-dynamic mode, and in the step 610, waits as much as the bandwidth switching delay time and then in the step 612, performs a control to transmit the corresponding data frame.

At this point, if the pseudo-dynamic mode is performed, the transmitting apparatus controller 307 may first check whether there is a gain in the transmission time by comparing the case of transmitting data by changing the transmission bandwidth and the case of transmitting data by minimum bandwidth. The check may be performed on the basis of the above Equation 2 described above. If there is no gain at the transmission time in the case where the transmission is performed by changing the bandwidth, the flow proceeds to the step 612 to transmit the data frame with the minimum bandwidth.

Figure 7:
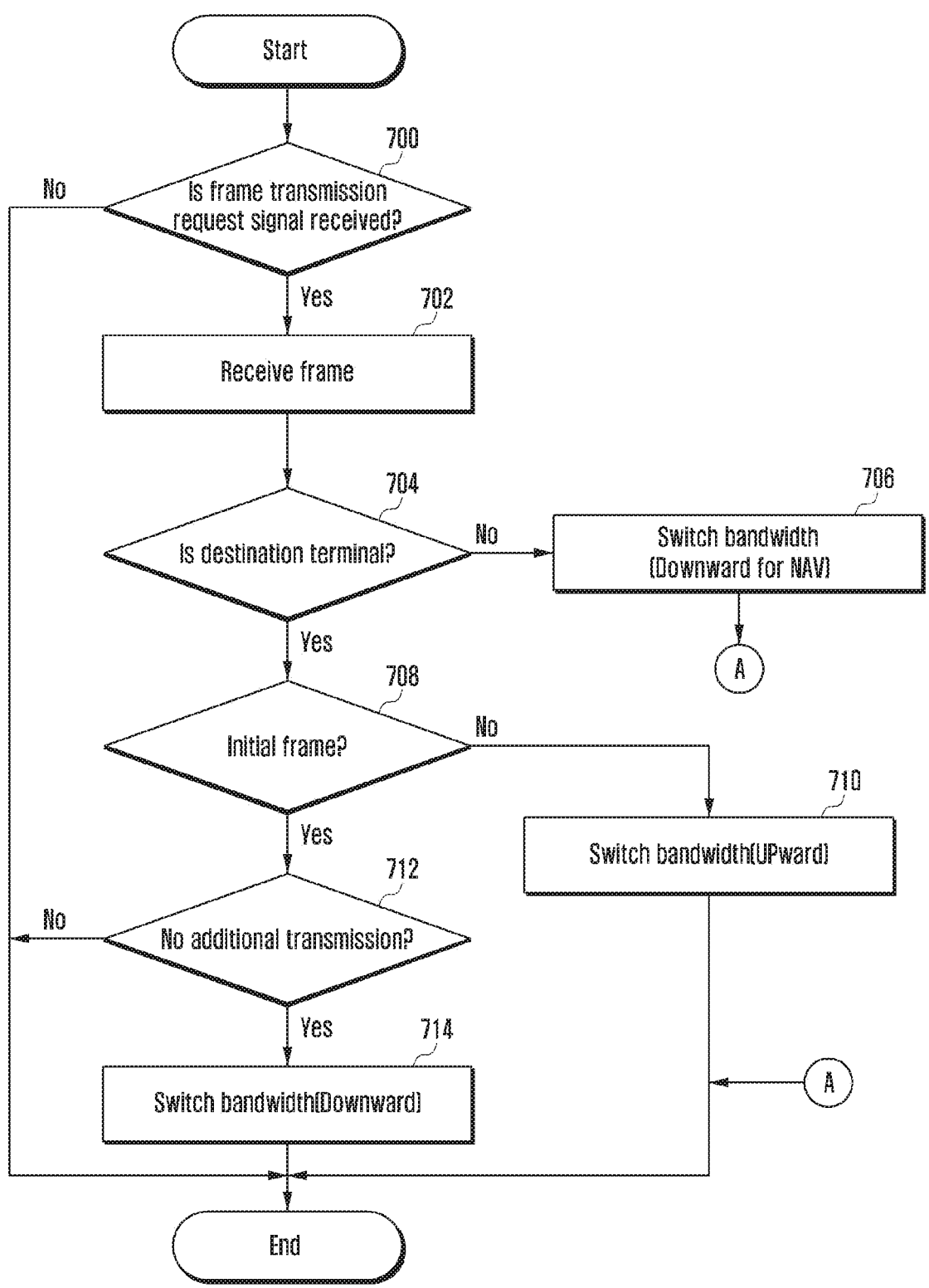
FIG. 7 is a control flow chart upon reception of a data frame from the access point in the terminal supporting the CBPS scheme.

FIG. 7 is a control flow chart upon the reception of the data frame from the access point in the terminal supporting the CBPS scheme.

In step 700, the receiving apparatus controller 407 checks whether a frame transmission request signal is received. The check may be a state where the check is made in the bandwidth of the reference channel as illustrated in FIGS. 5A to 5C. If the frame transmission request signal is received, in step 702, the corresponding frame is received from the access point. Next, the receiving apparatus controller 407 proceeds to step 704 to check whether a destination of the received frame is the terminal. Since the wireless LAN system always needs to hear all the frames, the frame is also received when the destination is not the terminal. Accordingly, if the destination of the frame received in the step 704 is a frame of the terminal, the receiving apparatus controller 407 proceeds to step 708 and proceeds to step 706 if the destination of the received frame is not the terminal and may be operated by the downward switching for the time indicated in the received frame.

When the flow proceeds from the step 704 to the step 708, the receiving apparatus controller 407 checks whether the received frame is the initial frame. If it is determined that the received frame is the initial frame, the receiving apparatus controller 407 proceeds to step 710 and switches a bandwidth upward. For example, the operation of setting the wireless LAN chipset to increase a bandwidth to 40 MHz in the state where the band of 20 MHz is checked, setting the wireless LAN chipset to increase a bandwidth to 80 MHz in the state where the band of 20 MHz is checked, or setting the wireless LAN chipset to increase a bandwidth to 160 MHz in the state where the band of 20 MHz is checked, and the like may be performed. At this point, the switching speed may vary depending on the characteristics of the terminal. That is, as described above, if the terminal supports the dynamic mode, the switching can be performed within the SIFS time and if the terminal supports the pseudo-dynamic mode, the switching may be performed for a time (time known by the access point and the terminal) longer than the SIFS time.

On the other hand, if it is determined as the check result in the step 708 that the frame is not the initial frame, since the terminal has already performed the bandwidth switching, the receiving apparatus controller 407 may receive the data frame and determine whether there is additional transmission using the information included in the received data frame. The receiving apparatus controller 407 may determine whether or not there is additional transmission by using the information of "0" or "1" set in the "More Data" field included in the data frame as described above.

If it is determined as the check result in step 712 that there is no additional transmission, the receiving apparatus controller 407 may proceed to step 714 to switch the bandwidth downward. By doing so, the power consumption in the terminal which is the receiving apparatus may be reduced. On the other hand, if it is determined in the step 712 that there is an additional transmission, the bandwidth switching may not be performed. However, referring to FIGS. 5A to 5C, if there is a data frame transmitted to another node, i.e., another terminal, between data frames, the receiving apparatus controller 407 may determine the NAV time to switch the bandwidth to the minimum bandwidth and may again perform the upward switching to the bandwidth agreed with the access point when the NAV time is terminated.

As described above, the present invention may obtain the power saving effect of the wireless LAN in two respects. Due to the inherent limitation, the wireless LAN senses an unnecessarily high bandwidth channel when there is no packet in the current wireless channel, i.e., in the idle state of the channel, thereby extremely consuming power.

Figure 8:
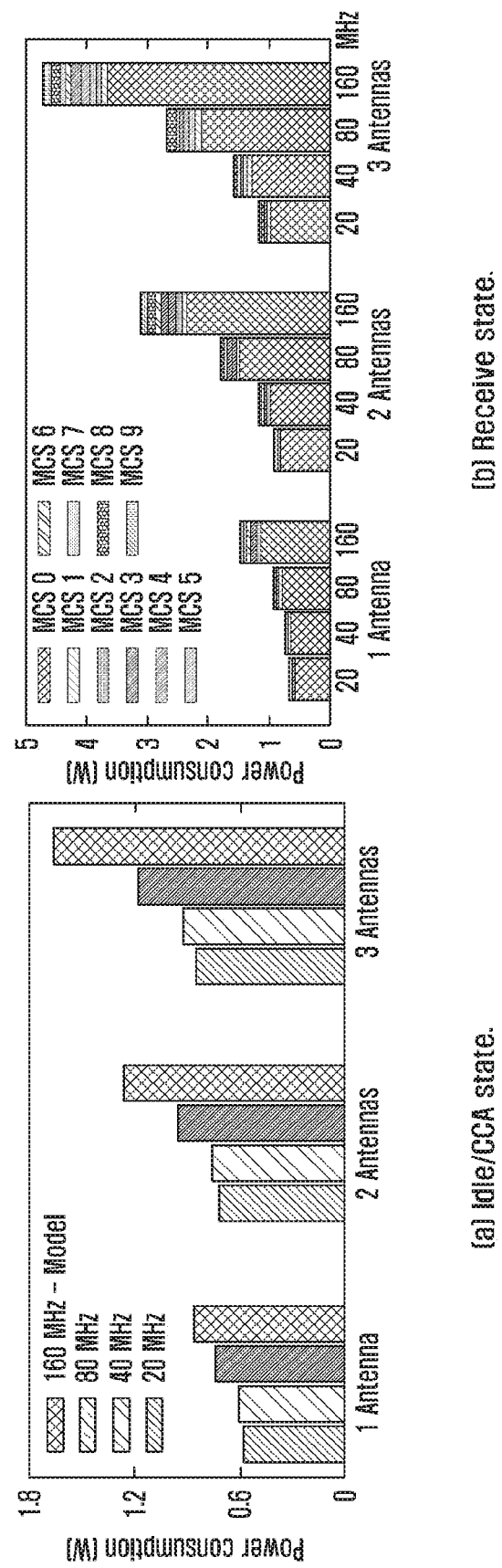
FIG. 8 is a graph illustrating a power consumption amount depending on a bandwidth in an idle state.

FIG. 8 is a graph illustrating the power consumption amount depending on the bandwidth in the idle state.

As can be seen from FIG. 8, it may be seen that the power consumption in the terminal of the wireless LAN system increases in proportion to the bandwidth. Also, since most of the time is spent in the idle time in the case of the wireless LAN, in the case of using the method according to the present invention, it is possible to significantly reduce the energy consumption of the terminal.

In addition, the wireless LAN may not know the receiving terminal of the current incoming frame and therefore needs to receive all frames. Therefore, the unnecessary reception power consumption is extremely severe. FIG. 8B is a measurement result that shows these results well. That is, the power consumed when the terminal receives a specific frame greatly increases depending on the bandwidth, and the increment is much larger than that in the idle state. However, according to the present invention, only the preamble is read and the frame whose bandwidth does not fit may be excluded, so that the energy consumption consumed in unnecessary reception may be greatly reduced.

FIG. 9 is a graph illustrating a simulation result of analyzing a power saving effect when the CBPS scheme according to the present invention is applied.

Referring to FIG. 9, it may be seen that when the bandwidth of 160 MHz is used, the power saving effect is about 73% in the case of 20 terminals and about 55% in the case of using 80 MHz.

As described above, the present invention can be widely applied to ultra-small smart phones, tablets and the like that makes much of battery life time, and it is expected that a large power saving effect will be obtained when the present invention is applied. Further, since the clock speed is not controlled, there is no problem in receiving the packet transmitted in the existing frame structure. In particular, it is very simple to implement and apply, and most of the proposed contents can be easily implemented and used even for the currently released commercial chips. Finally, it is possible to solve the problem of the coexistence with the legacy devices by simply defining a new action frame in the standard.

Hereinabove, the embodiments of the present invention disclosed in the present specification and the accompanying drawings have been provided to easily describe and assist in understanding the described content and do not limit the scope of the present invention. Therefore, it is to be understood that in addition to the exemplary embodiments of the present invention described herein, all the changed or modified forms derived from the technical spirit of the present invention are included in the scope of the present invention.

INDUSTRIAL APPLICABILITY

The present invention can be used for the wireless LAN communication.

The invention claimed is:

1. A method for an access point (AP) transmitting and receiving data to reduce power of a terminal in a wireless local area network (LAN) system, comprising:
    transmitting a control frame including information for a channel bonding power saving control function;
    determining whether the terminal is in an active state of the channel bonding power saving control function, if the AP has data to be transmitted to the terminal;
    checking whether the terminal is in a dynamic mode if the terminal is in the active state of the channel bonding power saving control function;
    configuring a frame for transmitting data to be transmitted in a channel bonding scheme, if the terminal is in the dynamic mode; and
    transmitting the frame for transmitting data to the terminal.

2. The method of claim 1, further comprising:
    waiting as much as a bandwidth switching time depending on a pseudo-dynamic mode reported from the terminal if the terminal is not in the dynamic mode.

3. The method of claim 2, further comprising:
    calculating a time taken to transmit the data to be transmitted to the terminal in a pseudo-dynamic mode and a data transmission time without the channel bonding scheme, if the terminal is not in the dynamic mode;
    transmitting a frame by the channel bonding scheme in the pseudo-dynamic mode if the time taken to transmit the data in the pseudo-dynamic mode is shorter than the data transmission time without the channel bonding scheme; and
    transmitting a frame without the channel bonding scheme if the time taken to transmit the data in the pseudo-dynamic mode is longer than the data transmission time without the channel bonding scheme.

4. The method of claim 1, further comprising:
    calculating a time taken to transmit the data to be transmitted to the terminal in a pseudo-dynamic mode and a data transmission time without the channel bonding scheme, if the terminal is in the dynamic mode;
    transmitting a frame by the channel bonding scheme in the dynamic mode, if the time taken to transmit the data in the dynamic mode is shorter than the data transmission time without the channel bonding scheme; and
    transmitting a frame without the channel bonding scheme, if the time taken to transmit the data in the dynamic mode is longer than the data transmission time without the channel bonding scheme.

5. The method of claim 1, further comprising:
    transmitting a management frame including information for the channel bonding power saving control function when the frame for transmitting data is required or periodically.

6. An access point (AP) apparatus for saving power consumption in a wireless local area network (LAN) system, comprising:
    a wireless processor configured to down-converter a band of a received wireless signal and up-converter a band of a signal to be transmitted;
    a modem configured to demodulate and decode of a signal received by the wireless processor and encode, modulate, and output a signal to be transmitted;
    a data processor configured to divide a size of data to be transmitted depending on the number of bands to be transmitted and the band;
    a memory configured to store whether a channel bonding power saving control function received from a terminal is activated and mode information; and
    a controller configured to control a generation and a transmission of a control frame including information for the channel bonding power saving control function of the access point, control the terminal to check whether the channel bonding power saving control function is in an activated state and a mode by checking the memory if the AP has data to transmit to the terminal, and control to configure a frame for transmitting data to be transmitted in a channel bonding scheme if the terminal is in the activated state of the channel bonding power saving control function and in a dynamic mode and transmit the frame for transmitting data to the terminal.

7. The access point apparatus of claim 6, wherein the controller further configure to wait as much as a bandwidth switching time depending on a pseudo-dynamic mode reported from the terminal if the terminal is not in the dynamic mode and then performs a control to transmit the data frame.

8. The access point apparatus of claim 7, wherein the controller further configured to:
    control to calculate a time taken to transmit the data to be transmitted to the terminal in a pseudo-dynamic mode and a data transmission time without the channel bonding scheme if the terminal is not in the dynamic mode,
    control transmit a frame by the channel bonding scheme if the time taken to transmit the data in the pseudo-dynamic mode is shorter than the data transmission time without the channel bonding scheme, and control transmit a frame without the channel bonding scheme if the time taken to transmit the data in the pseudo-dynamic mode is longer than the data transmission time without the channel bonding scheme.

9. The access point apparatus of claim 6, wherein the controller further configured to:
control to calculate a data transmission time taken to transmit the data in the dynamic mode and a data transmission time without the channel bonding scheme if the terminal is in the dynamic mode,
control transmit a frame by the channel bonding scheme in the dynamic mode, if the time taken to transmit the data in the dynamic mode is shorter than the data transmission time without the channel bonding scheme, and
control transmit a frame without the channel bonding scheme, if the time taken to transmit the data in the dynamic mode is longer than the data transmission time without the channel bonding scheme.

10. The access point apparatus of claim 6, wherein the control further configured to transmit a management frame including information for the channel bonding power saving control function when transmission of the frame for the data transmission is required or periodically.

11. A method for transmitting and receiving data for power saving of a terminal in a wireless local area network (LAN) system, comprising:
setting first information whether a channel bonding saving control function is possible, and mode information if a control frame including channel bonding power saving control function information is received;
transmitting first information and the mode information to a access point (AP);
checking, if the control frame is received during receiving only a primary band, whether the received control frame is an initial control frame; and
performing upward switching in a bandwidth required in the AP if the received control frame is the initial control frame.

12. The method of claim 11, further comprising:
downward switching the bandwidth as much as a data transmission time indicated in the received control frame, if the received control frame does not indicate the terminal.

13. The method of claim 11, further comprising:
downward switching the bandwidth for a time indicated in the received control frame if a destination of the received control frame is not the terminal.

14. The method of claim 11, further comprising:
downward switching the bandwidth if the received control frame indicates that there is no transmission of additional data.

15. An apparatus for transmitting and receiving data for power saving of a terminal in a wireless local area network (LAN) system, comprising:
a wireless processor configured to down-convert a band of a received wireless signal and up-converter a band of a signal to be transmitted;
a modem configured to demodulate and decode the received wireless signal received by the wireless processor and encode, modulate, and output the signal to be transmitted;
a data reconfiguration unit configured to reconfigure received data;
a memory configured to store information for a channel bonding power saving control function provided from an access point (AP) and information on whether the channel bonding power saving control function of the terminal is possible and mode information;
a controller configured to:
control to set a first information whether the channel bonding saving control function is possible and the mode information in the memory and the mode information if a control frame including channel bonding power saving control function information is received,
control to transmit the first information and the mode information;
control to check, if the control frame is received to control the wireless processor to receive only a primary band, whether the received control frame is an initial frame, and
control to perform the wireless processor to upward switch to a bandwidth required by the AP if the received control frame is the initial frame.

16. The apparatus of claim 15, wherein the controller further configured to control the wireless processor to downward switch the bandwidth as much as a data transmission time indicated in the received control frame, if the received control frame does not indicate the terminal.

17. The apparatus of claim 15, wherein the controller further configured to control the wireless processor to downward switch the bandwidth for a time indicated in the received control frame if a destination of the received control frame is not the terminal.

18. The apparatus of claim 15, wherein the controller further configured to control the wireless controller to downward switch the bandwidth if the received control frame indicates that there is no transmission of additional data.

* * * * *